United States Patent [19]

Sorimachi et al.

[11] Patent Number: 4,660,969

[45] Date of Patent: Apr. 28, 1987

[54] DEVICE FOR SEARCHING OBJECTS WITHIN WIDE VISUAL FIELD

[75] Inventors: Kanehiro Sorimachi; Takashi Kawabata, both of Kanagawa, Japan

[73] Assignee: Canon Kabushiki Kaisha, Tokyo, Japan

[21] Appl. No.: 762,557

[22] Filed: Aug. 5, 1985

[30] Foreign Application Priority Data

Aug. 8, 1984 [JP] Japan ................................ 59-166255

[51] Int. Cl.$^4$ ............................................. G01C 3/00
[52] U.S. Cl. ......................................... 356/1; 356/4; 356/376; 354/403; 364/561; 901/47
[58] Field of Search ....................... 356/1, 4, 375, 376; 364/460, 561; 901/47; 354/403

[56] References Cited

U.S. PATENT DOCUMENTS 4,300,836 11/1981 Holmes et al. ...................... 356/376
4,534,636 8/1985 Sugawara ............................ 354/403

FOREIGN PATENT DOCUMENTS 70108 4/1983 Japan .
129304 8/1983 Japan .

*Primary Examiner*—L. T. Hix
*Assistant Examiner*—D. Rutledge
*Attorney, Agent, or Firm*—Toren, McGeady and Goldberg

[57] ABSTRACT

A visual field searching device is arranged to divide the visual field to be searched into a plurality of intermediate fields each of which is larger than a constituent unit field; to select, for each of the intermediate fields, a typical or representative object distance data from among object distance data obtained for individual constituent unit fields included in each intermediate field; further, for each intermediate field, to discriminate whether the representative distance data thus selected is in a predetermined relation to other object distance data; and after that, to perform a signal processing operation to obtain necessary information by processing only the number of data representing the intermediate fields instead of processing all the data for all the constituent unit fields.

10 Claims, 2 Drawing Figures

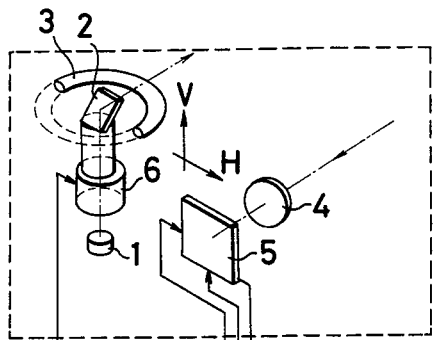
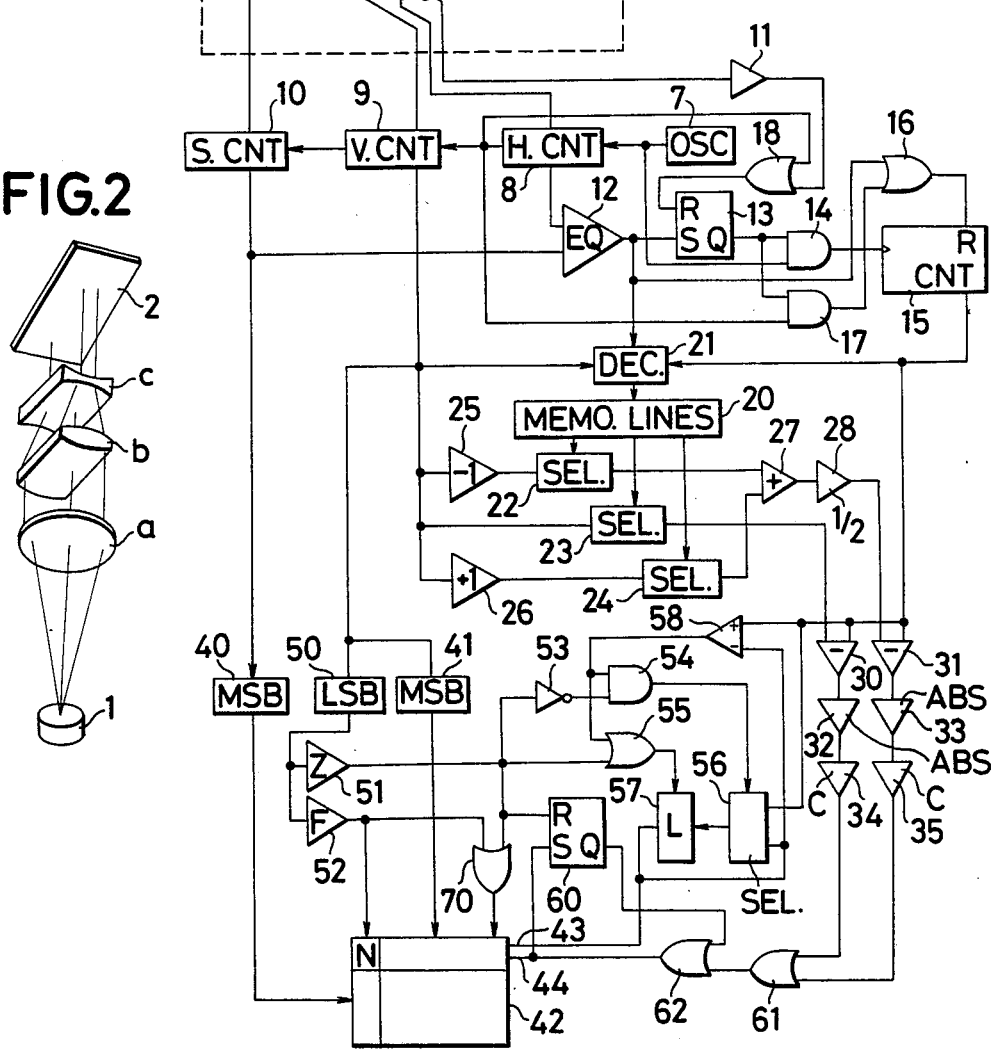

DEVICE FOR SEARCHING OBJECTS WITHIN WIDE VISUAL FIELD

BACKGROUND OF THE INVENTION

1. Field of the Invention:

This invention relates to a visual field searching device which is arranged to recognize object positions within a visual field to be searched and is adapted for application to the automatic focusing device of a photographic apparatus and the visual systems of robots or other automatic inspection apparatuses; and more particularly to a device which is capable of recognizing a wide visual field, by consolidating information for each of divided sections of the visual field to permit reduction in size of a storage device and shortening the length of time required in carrying out the ensuing computing operation.

2. Description of the Prior Art:

In the field of photographic cameras or the like, there have been proposed devices arranged to automatically measure a distance to an object for the purpose of enabling a photo-taking lens to be shifted to an in-focus position. However, since these devices are adapted for measuring a distance to an object located in a specific part within a visual field, they are not readily applicable to an apparatus such as a robot of the kind that must operate with incessant cognizance of a whole visual field.

Meanwhile, varied kinds of devices adapted for bringing a robot or the like into cognizance of objects have been known. For example, Japanese Laid-Open Patent Application No. SHO 58-129304 has disclosed a device for measuring a distance and an angle between two points existing in a three dimensional space. Further, Japanese Laid-Open Patent Application No. SHO 58-70108 has disclosed another device. In the latter device, a spot light is projected into a visual field; changes in the luminance of a point on which the spot light is projected are detected by a two dimensional sensor consisting of two TV cameras or the like; and a data for each point within the whole visual field is measured by detecting the position of the projected spot light in a three dimensional coordiate system. However, this device necessitates transformation of the data of the three dimensional coordinate into a data of polar coordinate for controlling the actions of a robot or the like. Besides, in enlarging a visual field, the optical distortion of an image which takes place according as the visual field is enlarged must be corrected. This results either in a prolonged data processing operation or a complex structural arrangement of the data processing device.

A further disadvantage of the prior art devices of the above-stated kind is as follows: For example, the device disclosed in Japanese Laid-Open Patent Application No. SHO 58-70108 is arranged to store the data obtained for every point within a visual field and to perform the ensuing process on the basis of all the data thus stored. Therefore, in case where the whole of a relatively wide visual field is to be subjected to distance measurement, the device necessitates use of storage means of a large capacity and a complex computing operation before recognizing an object by processing all the data.

SUMMARY OF THE INVENTION

It is a first object of the present invention to provide a device for recognizing objects within a visual field according to information on distances to these objects.

It is a second object of the invention to provide a device which is capable of obtaining such data that permits shortening a length of time required for a computing operation ensuing from the acquisition of the data.

It is a third object of the invention to provide a device which is capable of reducing the amount of data to be stored for an ensuing computing operation.

It is a fourth object of the invention to provide a device which is capable of performing a searching operation on a wide visual field.

An embodiment of this invention is arranged such that: instead of processing all the data obtained from all the picture elements of a photo-electric sensor amounting to a large number, say, 256×256 in recognizing a visual field, only a limited number of representative values, each representing the data within each of constituent divided portions of the visual field, that is, only a number of representative data amounting to, say, 64×64 or 32×32 are processed in recognizing the field. In addition to this arrangement, in cases where the value of a selected representative data excessively differs from the values of other data included in the same constituent portion of the visual field due to some discontinued point among objects, the device embodying this invention duly takes such inapposite representation into consideration.

These and further objects and features of this invention will become apparent from the following detailed description of a preferred embodiment thereof taken in connection with the accompanying drawings.

BRIEF DESCRIPTION OF THE DRAWINGS

FIG. 1 is a circuit diagram showing the circuitry of an embodiment of this invention including light projecting and receiving systems and a signal processing circuit.

FIG. 2 is an oblique view showing a part of the light projecting system.

DETAILED DESCRIPTION OF THE PREFERRED EMBODIMENT

The following describes the details of this invention through an embodiment thereof shown in the accompanying drawings:

Referring to FIG. 1 which shows the embodiment, the illustration includes a light emitting element 1 which is, for example, an infrared ray emitting diode. A light beam which is generated at the light emitting element 1 is horizontally reflected by a reflection mirror 2 which is arranged to turn on a vertically extending shaft. The reflected light is projected onto a photographing field at a varying light projecting angle. The projected light from the reflection mirror 2 is caused to vertically diverge by a divergent element 3. The divergent element 3 is formed, for example, by a ring-shaped rod lens which is transparent and has a circular sectional shape. The beam from the the light emitting element 1 is incident on a spherical lens "a" shown in FIG. 2. The spherical lens "a" transforms the incident beam into a parallel beam. Then, the parallel beam is transformed into a rectangular beam by an anamorphic converter which consists of cylindrical lenses "b" and "c". The rectangular beam converges in the neighborhood of the outside of the divergent element 3. After that the beam strongly diverges into a sheet-like state. A light receiving lens 4 is arranged to converge a reflection light coming from an object onto the light receiving surface of a two dimensional sensor 5. In the event of a particularly wide visual field, a fish-eye lens is employed as the light receiving lens 4. The two-dimensional sensor 5 is arranged within a plane perpendicular to the optical axis of the light receiving lens 4. The sensor 5 consists of, for example, many arrays of many CCD line sensor-photo sensor pairs arranged along a vertical direction V. A TV camera or the like may be employed as the sensor 5. A drive device 6 is arranged to cause the reflection mirror 2 to turn on the above-stated vertical shaft for the purpose of varying the panning direction of the projected light in the horizontal direction. For example, a hollow stepping motor is used for the drive device.

The light receiving lens 4 which is spaced at a predetermined base length away from the light projecting system is arranged to have a reflection light coming from the object as a result of the light projection imaged thereon. In other words, at the light receiving surface of the sensor 5, a light receiving angle in the horizontal direction at the converging point of the reflection light is detected. Then, the object distance can be obtained from the light receiving angle, together with the light projecting angle and the base line length in accordance with the principle of triangulation. (The light receiving angle=light projecting angle+parallel angle). Further, in this specific embodiment, the projected light is diverged in the vertical direction. Therefore, if the object is a flat surface, the converging points of the reflection light linearly exist on the light receiving surface of the sensor 5. Further, the object information on a cross section of the photographing field is likewise converted into the position of the converging line as a proximate polar coordinate system also in the vertical direction.

An oscillator 7 is arranged to generate clock pulses. A horizontal scanning counter 8 is provided for designating an address in a horizontal direction H on the sensor 5. A vertical scanning counter 9 is provided for designating an address in the vertical direction V on the sensor 5. A light projecting angle scanning counter 10 is provided for designating a change of the angle of light projection by the reflection mirror 2. The counter 8 is arranged to control the horizontal scanning of the sensor 5 by counting the clock pulses produced from the oscillator 7. The counter 9 is arranged to control the vertical scanning of the sensor 5 by counting a signal which is produced from the counter 8 upon completion of every horizontal scanning process of the sensor 5. Further, the counter 10 is arranged to count a signal produced from the counter 9 upon completion of every vertical scanning process of the sensor 5. The drive device 6 changes the light projecting angle by turning the reflection mirror 2 on the basis of the counted value thus obtained. A photo-electric conversion output is produced for every picture element of the sensor 5. The photo-electric conversion outputs from these picture elements are supplied one after another to a binary coding circuit 11 in the order of the vertical and horizontal addresses designated by the counters 8 and 9. The binary coding circuit 11 converts each of the photo-electric conversion outputs coming from the sensor 5 into a binary value on the basis of a peak value or the like. More specifically, the circuit 11 converts a maximum output obtained during one horizontal scanning period into a value "1" (a high level) and each of other outputs obtained during the same period into a value "0" (a low level).

A comparator 12 is arranged to compare the count number of the horizontal scanning of the sensor 5 with the count number of light projection counted by the counter 10. When these two counted values comes to coincide with each other, the comparator 12 produces a high level (hereinafter referred to as an H level) output. The H level output sets a set-reset type flip-flop (hereinafter referred to as RS-FF) 13. The H output also comes via an OR gate 16 to reset the contents of a counter 15. With the RS-FF 13 thus set, the level of one input of an AND gate 14 becomes an H level. This causes the counter 15 to begin to count the clock pulses coming from the oscillator 7 via the AND gate 14 from that point of time. Following this, when the output level of the binary coding circuit 11 becomes an H level with a photo-electric conversion output produced at a peak value as a result of the horizontal scanning of the sensor 5, the H level output of the circuit 11 comes via an AND gate 18 to reset the RS-FF 13. This causes the output level of the AND gate 14 to become a low level (hereinafter referred to as an L level). Then, the counting operation of the counter 15 on the clock pulses comes to a stop. The counted value of the counter 15 obtained at that time represents information obtained by deducting the light projecting angle information from the light receiving angle information obtained from the sensor 5, i.e. parallax angle information which corresponds to a distance data.

In case that the object is located at an infinity distance, it is impossible to detect any light converging point. It is, therefore, impossible to reset the RS-FF 13 by means of the output of the binary coding circuit 11. In that event, upon completion of one performance of the horizontal scanning of the sensor 5, an H level signal which is produced from the counter 8 to the counter 9 is transmitted via an OR gate 18 to the R input terminal of the RS-FF 13 to have the RS-FF 13 reset thereby. In this instance, the output level of an AND gate 17 temporarily becomes an H level until the RS-FF 13 is reset by the signal. Therefore, upon completion of the horizontal scanning process of the sensor 5, this H level output comes via an OR gate 16 to reset the counter 15. Then the counted value obtained at the counter 15 becomes "0" which is parallax angle information indicative of an infinity distance.

A memory line arrangement 20 is arranged to have the same number of memory as the number of the scanning lines of the sensor 5, i.e. the number of addresses in the vertical direction of the sensor 5. If the sensor 5 has 256 scanning lines, the memory line arrangement 20 includes 256 independent memories. A decoder 21 is arranged to receive from the counter 9 information on the number of performances of vertical scanning of the sensor 5 and thereby to cause the parallax angle information produced at the counter 15 to be stored at a memory corresponding to each count number of the scanning performances. When the output level of the comparator 12 becomes an H level, the decoder 21 causes the parallax angle information of the counter 15 to be stored at applicable memories within the memory line arrangement 20. Selectors 22, 23 and 24 are arranged to select predetermined parallax angle information from the memory line arrangement 20 according to the count number of the vertical scanning performances obtained from the counter 9. The selector 22 has the counted value of the counter 9 supplied thereto via a subtracter 25 which subtracts "1" from an input value. The selector 23 has the counted value of the counter 9 supplied thereto. The selector 24 has the counted value of the counter 9 supplied thereto via an adder 26 which adds "1" to an input value.

Each of the memories of the memory line arrangement 20 is arranged to erase previous parallax angle information when new parallax angle information is stored. With the memory line arrangement 20 arranged in that manner, the outputs of the selectors 22, 23 and 24 become as follows: Assuming that the existing counted o the counters 9 and 10 are N and M respectively, the output of the selector 22 becomes parallax angle information produced from the counter 15 when the counted value of the counter 9 becomes N−1 while that of the counter 10 is M. The output of the selector 23 becomes parallax angle information produced from the counter 15 when the counted value of the counter 9 is N while that of the counter 10 becomes M−1. The output of another selector 24 becomes parallax angle information produced from the counter 15 when the counted value of the counter 9 becomes N+1 while that of the counter 10 becomes M−1. The information values thus produced from the selectors 22 and 24 are added up by the adder 27 and then averaged by an multiplier 28 which is arranged to multiply the output of the adder by ½.

Substracters 30 and 31, absolute value obtaining circuits 32 and 33 and comparators 34 and 35 jointly form a discrimination circuit which is arranged to detect the discontinuity of distance measuring objects located around a distance measuring object which is presently under a distance measuring operation. In other words, various distances and curving points of these objects are arranged to be cognizable by detecting a difference between the parallax angle information on a specific distance measuring object and the parallax angle information on other object located adjacent to the specific object. The subtracter 30 is arranged to arithmetically obtain a difference between the parallax angle information on the presently distance measuring object and information obtained from the selector 23. The other subtracter 31 is arranged to arithmetically obtain a difference between the parallax angle information on the presently distance measuring object and information obtained from the multiplier 28. The information values produced from the subtracters 30 and 31 are converted into absolute values by the absolute value obtaining circuits 32 and 33 respectively. Following that, these information values are supplied to the comparators 34 and 35. If these information values are larger than predetermined values, that is, if the parallax angle information value on the presently distance measuring object is excessively differing from the parallax angle information on the adjacent distance measuring objects, these comparators produce H level signals. As apparent from the foregoing description, the output of the comparator 34 changes according to the discontinuity in the horizontal direction from the presently distance measuring object. The output of the other comparator 35 changes according to the discontinuity in the vertical direction from the presently distance measuring object.

The parallax angle information presently existing within the counter 15 is stored at an applicable memory of the memory line arrangement 20 when the output level of the comparator 12 becomes an H level for the purpose of initiating a detecting operation on the next parallax angle information.

A detector 40 is arranged to extract a higher figure of the light projection scanning counted value of the counter 10 (e.g. a figure higher than the second place). Another detector 41 is arranged to extract a higher figure of the vertical scanning counted value of the counter 9 (e.g. a figure lower than the second place). A memory 42 is arranged to receive and produce memory information using the value of the higher place figure extracted by the detector 40 as an address in the direction of X (horizontal direction) and the value of the higher place figure extracted by the other detector 41 as an address in the direction of Y (vertical direction). The memory 42 is provided with a chip enable element. While an H level signal is applied from an OR gate 70 to the terminal of this chip enable element, the memory 42 performs information receiving and producing operations through signal lines 43 and 44 on the basis of the addresses arranged in the directions X and Y. Another detector 50 is arranged to extract a lower place figure of the vertical scanning counted value of the counter 9 (e.g. a figure of the first place). A discriminator 51 is arranged to produce its output at an H level when the value of the lower place figure extracted by the detector 50 becomes "0". Another discriminator 52 is arranged to produce its output at an H level when the value of the lower place figure extracted by the detector 50 becomes a maximum value of the place (the maximum value is "9" in the event of the decimal system). The outputs of these discriminators 51 and 52 are used for controlling the timing for reading the information from the domain of the memory 42 designated by the X- and Y-addresses obtained from the detectors 40 and 41 and also for writing the information into the applicable area of the memory 42.

When the output level of the discriminator 51 becomes the H level with the output of the detector 50 becoming "0", the output level of the OR gate 70 becomes an H level. Then, the memory 42 produces to a line 43 parallax angle information out of the information stored within the domain based on the X- and Y-addresses obtained from the detectors 40 and 41 and also produces a result of discrimination of the above-stated discontinuity to another line 44. In this instance, if another domain has been newly designated by the X- and Y-addresses from the detectors 40 and 41, the output to the line 43 is "0" and the output to the line 44 is at an L level. Meanwhile, since the output terminal of the discriminator 51 is connected via an inverter 53 to one of the input terminals of an AND gate 54, the output level of the AND gate 54 becomes an L level when the output level of the discriminator 51 becomes an H level. The L level output of the AND gate 54 permits information produced at the line 43 to be supplied to a latch circuit 57. At this time, since an H level signal from the discriminator 51 has been applied via the OR gate 55 to the latch circuit 57, the latch circuit 57 latches the information from the selector 56. Further, at this time, an RS-FF 60 is reset by the H level output of the discriminator 51. However, if the discrimination signal produced to the line 44 is at an H level indicating a discontinuity, the S input terminal of the RS-FF 60 takes priority to bring the RS-FF 60 into a set state. In that event, the information of the domain of the memory 42 designated by the X- and Y-addresses obtained from the detectors 40 and 41 comes to be held at the latch circuit 57 and the RS-FF 60 respectively.

After this, when parallax angle information is obtained at the counter 15 for each of the distance measuring objects according to changes in the vertical scannrng counted value of the counter 9, the comparator 58 compares the parallax angle information of the counter 15 with that of the latch circuit 57 every time the parallax angle information is produced. The comparator 58 then produces its output at an H level when the information from the counter 15 is larger than the information from the latch circuit 57. At that point of time, since the output level of the inverter 53 has become an H level, the output level of the AND gate 54 also becomes an H level as the H level output is produced from the comparator 58. Therefore, when the output level of the comparator 58 becomes the H level, the parallax angle information of the counter 15 is supplied via the selector 56 to the latch circuit 57. Further, since the H level output of the comparator 58 is also supplied to the latch circuit 57 via the OR gate 55 at that time, the latch circuit 57 latches the information.

Concurrently with this, the discontinuity of the parallax angle information of the counter 15 is discriminated by the arrangement described in the foregoing. In case that the parallax angle information on the presently distance measuring object greatly differs from the parallax angle information on adjacent other objects, the output level of at least one of the comparators 34 and 35 becomes an H level. The H level output then comes to set the RS-FF 60 via OR gates 61 and 62. This operation is repeated every time the vertical sanning counted value of the counter 9 changes to have the maximum value oi the parallax angle information (a distance data indicative of the nearest distance) latched by the latch circuit 57. Following this, when the output level of the discriminator 52 becomes an H level according to the change of the vertical scanning counted value of the counter 9, the memory 42 writes a respresentative value of the parallax angle information kept at the latch circuit 57 into a domain corresponding to the X- and Y- addresses obtained from the detectors 40 and 41. The memory 42 also has the Q output of the RS-FF 60 which represents a discontinuity discrimination value written in via the OR gate 62. In other words, when the output level of the discriminator 52 becomes an H level, the largest value of the parallax angle information obtained during a period between the time when the output level of the discriminator 51 becomes an H level and the time when the output level of the discriminator 52 becomes an H level is stored in the domain designated by the X- and Y- addresses obtained from the detectors 40 and 41. In addition to that, another discrimination value indicating whether or not there has been obtained any discontinuous parallax angle information during the above-stated period is also stored. This operation is repeated at intervals according to the period of the lower place figure of the counted value of the counter 9. The representative value and the discrimination value obtained for each of the periods are stored in the domain of the memory 42 designated by the X- and Y-addresses obtained from the detectors 40 and 41.

Therefore, upon completion of light projection over the whole of the visual field on the basis of the counted value of the counter 10, the representative parallax angle information on each of small constituent portions of the visual field defined on the basis of the period of the lower place of the counted value of the counter 9 and the discrimination value for discriminating whether the specific small constituent portion of the visual field includes any discontinuous point are stored in the domain of the memory 42 corresponding to the small portion. After that, a processing operation is performed for the purpose of recognizing the whole visual field on the basis of the data stored within the memory 42. However, the details of this processing operation are omitted from the following description as it is outside of the scope of this invention.

In this specific embodiment, the data precessing operation for reading the data obtained from the sensor 5 is correlated to the timing axis for horizontal scanning defined by the counter 8. Therefore, the light projecting angle is arranged to be varied at every 1/30 sec. The number of scanning lines of the sensor 5 (the number of addresses in the vertical direction) may be set at 256. The processing rate may be set at about 7.7 KHz or below. In that event, in accordance with the arrangement of this embodiment, a data on distances from a specific vertical sectional plane of a visual field for a specific light projecting angle can be adequately maintaind, for example, by means of the memory arrangement 20 divided into 256 sections and the memory 42 consisting of 32 vertical sections or thereabout. Therefore, with the light projection scanning by the counter 10 arranged to be made by 32 steps, sufficient information for recognizing the whole visual field is obtainable with the memory storage divided into $256 + 32 \times 32$ memory sections or thereabout by processing the representative distance data and the discontinuity discriminating value of each section obtained by dividing the visual field into $32 \times 32$ sections. Further, with the number of the light projection scanning steps set at 32 steps, the length of time required for processing the information obtained from the whole visual field can be arranged to be about one second.

Further, with the number of the devided sections of the memory 42 arranged to be $32 \times 32$ and the light projection scanning count number of the counter 10 to be 256, each of the divided sections of the memory 42 stores therein a typical value representing distance data for $8 \times 8$ distance measuring objects existing within the corresponding divided sections of the visual field and a discrimination value relative to a discontinuous point existing within the same divided sections. In this instance, the whole visual field is recognized on the basis of the $32 \times 32$ representative distance data and the $32 \times 32$ discrimination values. If such discontinuous points are indicated not by all of the discrimination values, the ensuing process which is to be carrie out for the purpose of recognizing the whole visual field can be simplified and performed only on the $32 \times 32$ data. Further, even in cases where some characteristic parts that have such discontinuous points exist on border lines between these divided sections or inside of them, these parts are detectable by checking $32 \times 32$ bits ($\approx$1K bit). Therefore, the visual field recognition by means of the typical or representative distance data of $32 \times 32$ bytes ($\approx$1K byte) can be readily prevented from omitting information in the same manner as the visual field recognition made on the basis of distance data of $256 \times 256$ bytes. In accordance with the arrangement of this embodiment, therefore, such high speed storage means of $256 \times 256$ bytes ($\approx$64K bytes) that is necessary in recognizing a visual field by processing all the data of $256 \times 256$ bytes can be dispensed with in performing visual field recognition with about the same degree of accuracy. For example, in accordance with the arrangement of this embodiment, it suffices to use storage means of about $256 + 32 \times 32$ bytes ($\approx$1.2K bytes).

Since a flat background surface within a visual field is not in a discontinuous state, arrangement to omit the process of detecting the discrimination value for that portion of the visual field would permits further simplification of an ensuing process for visual field recognition.

Conceivable modifications of this embodiment include the following:

If the recognition is not required for a wide angle visual field, the light receiving lens 3 does not have to be a fish-eye lens but it may be replaced with an ordinary lens. In that event, the light projecting arrangement may be replaced with a slit light projecting arrangement. The arrangement to have the light projecting angle changed stepwise upon completion of the vertical scanning of the sensor 5 may be replaced with an arrangement to make the counted value of the counter 10 coincide with the variation in the angle counted value by slowing the light projection scanning speed. Further, it is not absolutely necessary to have the representative value of each divided section of the visual field arranged to be a distance data indicative of the nearest distance among other data of the same divided section. For example, the average value of the data of each divided section may be selected as the representative value. Such a change in the selection of representative values can be readily made by chaning the parts around the comparator 58.

In the device for recognizing the whole visual field by processing data on many object distances according to this invention, the whole visual field can be accurately recognized by processing a fewer number of data than the number of distance measuring objects located within the visual field. Therefore, the invention permits reduction in the storage capacity and an increase in the data processing speed.

What is claimed is:

1. A visual field searching device comprising:
   detecting means for detecting distance data indicative of distances to objects located within each of constituent unit domains of a visual field;
   dividing means for dividing the visual field into intermediate domains each of which is larger than each of said constituent unit domains;
   selecting means for selecting representative distance data from said distance data included in each of said divided intermediate domains;
   discriminating means for discriminating whether other distance data within each of said intermediate domains are in a predetermined relation to said representative distance data of the same domain; and
   storing means for storing said representative distance data and the result of said discrimination for each of said intermediate domains.

2. A device according to claim 1, wherein said detecting means includes a light projecting system and a light receiving system which are spaced a base length away from each other, said light receiving system including an image detector.

3. A device according to claim 2, wherein said image detector is a two-dimensional array of photo-sensors.

4. A device according to claim 2, wherein said light projecting system is arranged to scan a visual field with a beam or light.

5. A device according to claim 4, wherein said beam is a sheet-like beam.

6. A device according to claim 1, wherein said selecting means is arranged to select, as said representative distance data, distance data relative to the nearest object distance within each of said intermediate domains.

7. A device according to claim 1, wherein said discriminating means is arranged to detect the continuity among said distance data.

8. A signal processing method comprising:
   a step of detecting distance data relative to a distance to an object for every picture element of an image detector;
   a step of grouping and consolidating a plurality of picture elements into a plurality of grouped sections;
   a step of selecting representative distance data from among distance data included in each of grouped section;
   a step of detecting the continuity or discontinuity of said distance data relative to each other within each of said grouped sections; and
   a step of having said representative distance data and the result of said discontinuity detection produced in a pair for each of said grouped sections.

9. A method according to claim 8 wherein said distance data are obtained in accordance with the method of triangulation.

10. A method according to claim 8, wherein said representative distance data is distance data indicative of the nearest object distance among distance data within each of said grouped sections.

* * * * *